United States Patent [19]

Aiso et al.

[11] Patent Number: 5,027,682

[45] Date of Patent: Jul. 2, 1991

[54] ATTACHMENT MOUNTING MECHANISM IN A MACHINE TOOL

[75] Inventors: Katsuyoshi Aiso, Numazu; Osamu Funada, Mishima; Takao Date, Kannami, all of Japan

[73] Assignee: Toshiba Kikai Kabushiki Kaisha, Japan

[21] Appl. No.: 482,930

[22] Filed: Feb. 22, 1990

[30] Foreign Application Priority Data

Feb. 27, 1989 [JP] Japan .................................. 1-45964

[51] Int. Cl.$^5$ ............................................ B23B 19/02
[52] U.S. Cl. ...................................... 82/142; 82/147; 82/159; 82/161
[58] Field of Search ................... 82/142, 147, 159, 161

[56] References Cited

U.S. PATENT DOCUMENTS

| 3,798,721 | 3/1974 | Schalles | 82/159 |
| 4,467,680 | 8/1984 | Kettel | 82/159 |

*Primary Examiner*—Frederick R. Schmidt
*Assistant Examiner*—Lawrence Cruz
*Attorney, Agent, or Firm*—Stevens, Davis, Miller & Mosher

[57] ABSTRACT

A mechanism for detachably mounting any selected one of several attachments to a hollow spindlehead ram within which a spindle is rotatably supported by a hollow shaft, the latter being capable of both rotary and axial displacement relative to the ram. Both the hollow shaft and the selected attachment are coupled with the ram via Curvic coupling teeth. Further, in order to retain the attachment in positive engagement with the ram via the Curvic coupling teeth, a series of external locking teeth are formed on the hollow shaft at constant circumferential spacings for engagement with a series of internal locking teeth formed on the attachment. The hollow shaft forces the attachment against the ram via the interengaged locking teeth under hydraulic pressure.

3 Claims, 2 Drawing Sheets

FIG. I

ATTACHMENT MOUNTING MECHANISM IN A MACHINE TOOL

BACKGROUND OF THE INVENTION

This invention relates to a mechanism in a machine tool for detachably mounting any selected one of interchangeable attachments to the spindlehead of the machine tool in driven engagement with the spindle.

A variety of mechanisms have been suggested and used for automatically mounting and dismounting attachments such as an angle head and a multiple spindlehead to and from the spindlehead of a machine tool. Typical of such known mechanisms is the one wherein a plurality of, usually four, pull studs on the attachment are clamped by collets on the spindlehead. Another known mechanism employs bolts for fastening a flange on the attachment to the front end of the spindlehead. Still another conventional device, taught by Japanese Patent Laid-open Publication No. 58-94946, has T bolts on the spindlehead which are capable of both rotary and linear displacement for engagement in T slots in the attachment.

These and other comparable prior art devices are all unsatisfactory in the number of positions to which the attachment can be indexed. The accuracy of indexing has not been so high as can be desired, either. An additional drawback of the prior art, possibly with the exception of the bolting method, is that the attachment cannot be clamped so firmly as to enable heavy cutting operations by large machine tools.

SUMMARY OF THE INVENTION

The present invention solves the problems of how to mount an attachment to a machine tool with sufficient rigidity for any heavy cutting operations and with the capability of being accurately indexed to a greater number of positions than heretofore.

Briefly, the invention may be summarized as an attachment mounting mechanism for a machine tool, comprising a hollow spindlehead ram within which a spindle is rotatably mounted via a hollow shaft, the latter being capable of both rotary and axial displacement relative to the ram. The ram has a first set of Curvic (tradename) coupling teeth formed on its front end. The hollow shaft has a series of external locking teeth and a second set of Curvic coupling teeth formed on its front end portion projecting out of the front end of the ram. The second set of Curvic coupling teeth is movable into and out of positive engagement with the first set of Curvic coupling teeth with the axial movement of the hollow shaft relative to the hollow ram. A hydraulic drive means is employed for reciprocably moving the hollow shaft, together with the spindle therein, axially relative to the ram. A detent means interengages the hollow shaft and the spindle for joint rotation relative to the hollow ram upon axial displacement of the hollow shaft and the spindle toward the front end of the hollow ram, and disengages the hollow shaft and the spindle from each other upon axial displacement thereof in a direction away from the front end of the hollow ram. To be interchangeably mounted to the front end of the ram, a plurality of attachments have each a third set of Curvic coupling teeth capable of positive engagement with the first set of Curvic coupling teeth on the ram, and a series of internal locking teeth to be engaged by the external locking teeth on the hollow shaft for holding the third set of Curvic coupling teeth in positive engagement with the first set of Curvic coupling teeth. The internal and the external locking teeth are capable, when positioned out of phase with each other by the rotation of the hollow shaft relative to the hollow ram, of traversing each other in the axial direction of the hollow shaft in order to permit the attachment to be mounted to and dismounted from the front end of the ram.

Thus, by retracting the hollow shaft into the ram by the hydraulic drive means, the external locking teeth on the hollow shaft engages the internal locking teeth on the attachment, so that the sets of Curvic coupling teeth on the attachment and the hollow shaft are both maintained in positive engagement with the Curvic coupling teeth on the ram under hydraulic pressure. The mounting of the attachment to the ram via the Curvic coupling under hydraulic pressure offers the advantages of high rigidity with which the attachment is supported by the ram, and the even distribution of coupling pressure at the mating surfaces of the attachment and the ram. Additionally, the attachment can be easily and accurately indexed to any of as many angular positions as the number of each set of Curvic coupling teeth. The attachment mounting mechanism of this invention is well calculated to permit full automation of the complete process of each change from one attachment to another by the familiar sequence control technology.

The above and other features and advantages of this invention and the manner of realizing them will become more apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
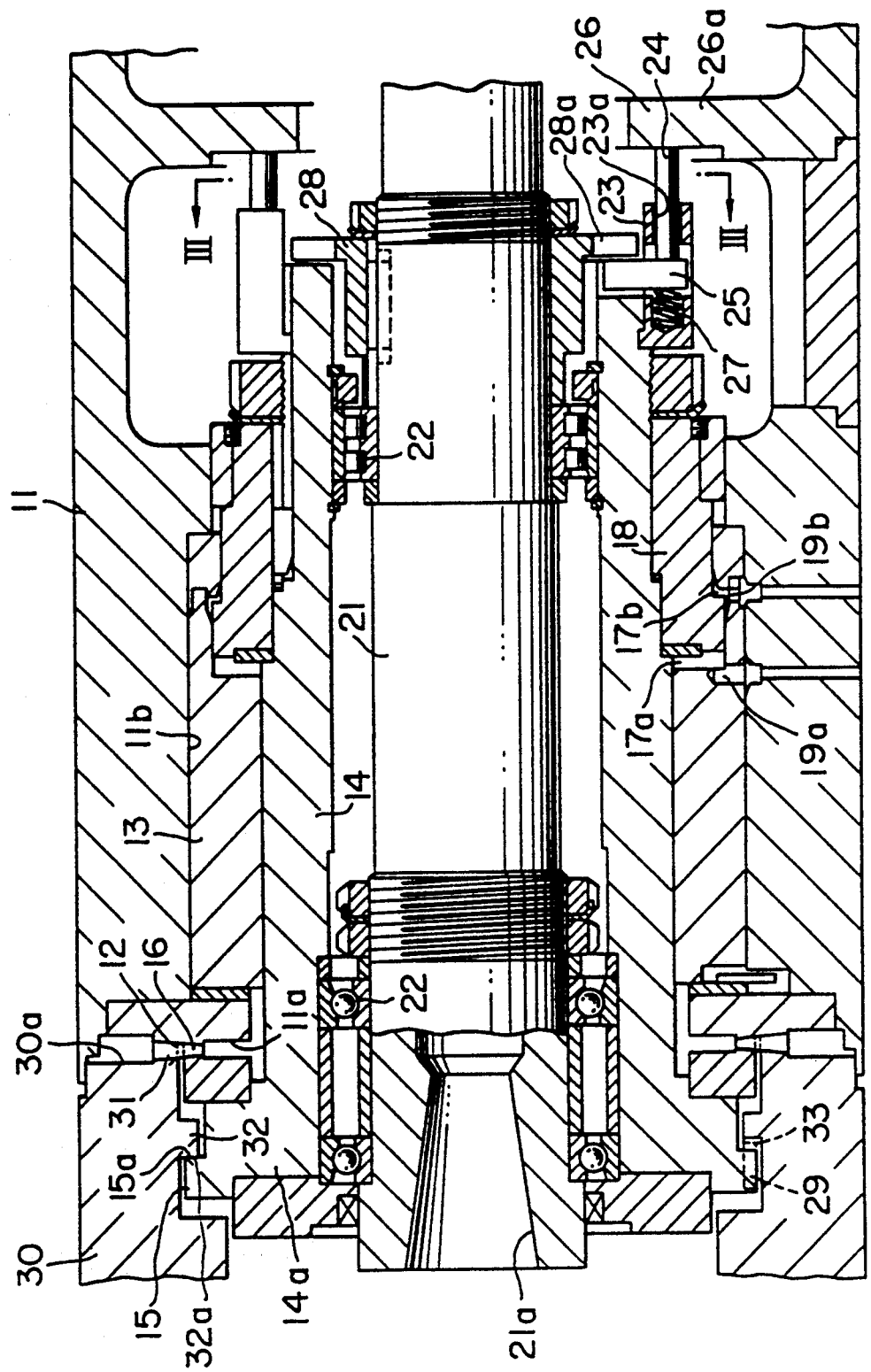
FIG. 1 is an axial section through a spindlehead ram incorporating the attachment mounting means in accordance with the invention, the spindlehead ram being shown together with a partial illustration of an attachment mounted to the ram.

The invention is illustrated in FIG. 1 as adapted for mounting an attachment 30 to a hollow ram 11, or to any equivalent linearly guided structure, which is included in the spindlehead of a machine tool. Square in shape as seen in an end view as in FIG. 2, the ram 11 has a first set of Curvic coupling teeth 12 formed on its end 11a, shown directed to the left in FIG. 1, in annular arrangement and in a concentric relation to the hollow 11b extending through the ram.

Hereinafter in this specification the directional terms such as "front" and "rear", and "forward" and "rearward", as well as derivative thereof, will be used with the understanding that the end 11a of the ram 11 is its front end. Thus, for example, the attachment 30 is disposed forwardly of the ram 11, with its rear end 30a held against the front end 11a of the ram.

Snugly fitted in the hollow 11b in the ram 11 is a sleeve bearing 13 slidably supporting a hollow shaft 14 for both axial and rotary displacement. The hollow shaft 14 has a front end 14a projecting forwardly beyond the front end 11a of the ram 11.

Figure 2:
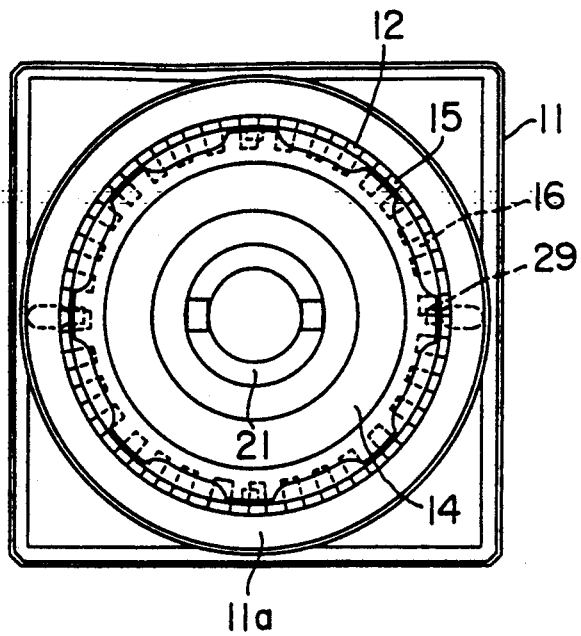
FIG. 2 is a front end elevation of the spindlehead ram of FIG. 1 in the direction of arrow II but without the attachment 30 being in place.

As will be seen also from FIG. 2, a plurality of, eight in the illustrated embodiment, locking teeth 15 are formed at constant circumferential spacings on the front end 14a of the hollow shaft 14. The locking teeth 15 serve to hold the attachment 30 locked to the hollow shaft 14 in a manner yet to be described.

Both FIGS. 1 and 2 indicate a second annular row of Curvic coupling teeth 16 which are formed on the hollow shaft 14 in a position spaced rearwardly from the locking teeth 15. This second set of Curvic coupling teeth 16 positively engage the first set of Curvic coupling teeth 12 on the ram housing 14 when the hollow shaft 14 is fully retracted into the ram 11 as shown in FIG. 1.

In order to move the hollow shaft 14 axially relative to the ram 11 for a change from one attachment to another, this embodiment employs a piston 18 of annular shape concentrically and immovably fitted over the hollow shaft. The piston 18 is received in an annular space defined around the hollow shaft 14, dividing the space into a pair of opposed fluid chambers 17a and 17b. These fluid chambers 17a and 17b communicate with a source of a hydraulic fluid under pressure and a fluid drain, both not shown, via ports 19a and 19b and suitable piping and valving. The piston 18 travels back and forth with the hollow shaft 14 relative to the ram 11 as the pair of fluid chambers 17a and 17b are alternately placed in and out of communication with the unshown pressurized fluid source and fluid drain.

Thus the hollow shaft 14 retracts into the ram 11 upon introduction of the pressurized fluid into the fluid chamber 17a, and projects forwardly of the ram upon introduction of the pressurized fluid into the other fluid chamber 17b. FIG. 1 shows the hollow shaft 14 retracted into the ram 11.

A spindle 21 is rotatably and coaxially mounted within the hollow shaft 14 via a pair of bearings 22. A tapered hole 21a is formed in the front end portion of the spindle 21 for receiving a tapered shank, not shown, forming a part of the attachment 30.

Normally, or when the attachment mounting mechanism is conditioned for cutting operation as depicted in FIG. 1, the spindle 21 is rotatable relative to the hollow shaft 14, the latter being held stationary with respect to the ram 11. The spindle 21 must, however, rotate a predetermined angle with the hollow shaft 14 for dismounting the attachment 30. The illustrated embodiment employs the following means for connecting and disconnecting the hollow shaft 14 and the spindle 21 into and out of joint rotation with each other.

Figure 3:
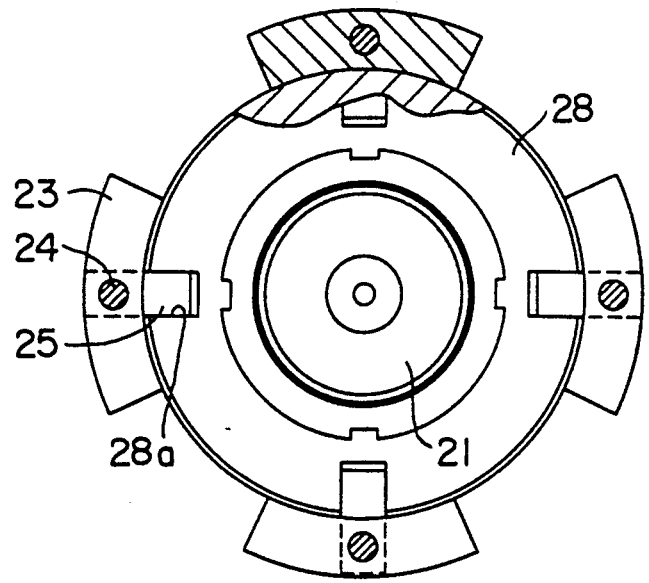
FIG. 3 is a section taken along the line III—III in FIG. 1 and showing in particular the detent means for interconnecting the spindle and the hollow shaft for joint rotation relative to the ram.

As will be seen from both FIGS. 1 and 3, the hollow shaft 14 has a plurality of, four in this particular embodiment, support portions 23 projecting radially outwardly from its rear end at constant circumferential spacings. Each support portion 23 has formed therein a hole 23a extending parallel to the axis of the hollow shaft 14 for slidably receiving a carrier bar 24. Each carrier bar 24 rigidly carries a detent 25 extending radially inwardly of the hollow shaft 14. Coiled around the carrier bar 24, a helical compression spring 27 acts between hollow shaft 14 and carrier bar 24, holding the rear end of the carrier bar in slidable contact with an annular abutment 26 formed in one piece with the ram 11. The spindle 21 has a flange 28 in which notches 28a are formed in positions of radial alignment with the detents 25. The notches 28a are sized to receive the detents 25 with minimal clearances.

In the normal state of the attachment mounting mechanism represented in FIG. 1, the detents 25 on the carrier bars 24 are positioned axially displaced forwardly of the notches 28a in the spindle flange 28. The spindle 21 is therefore free to rotate relative to the hollow shaft 14. The spindle 21 is to be thrust forwardly of the ram 11 together with the hollow shaft 14 for the engagement of the detents 25 in the notches 28a. Despite this forward travel of the hollow shaft 14, the compression springs 27 act to hold the carrier bars 24 butting on the abutment 26 in one piece with the ram 11. Consequently, the notches 28a in the spindle flange 28 come into positive engagement with the relatively fixed detents 25 on the carrier bars 24. Then the hollow shaft 14 becomes rotatable with the spindle 21, with the carrier bars 24 sliding over the surface of the abutment 26.

Figure 4:
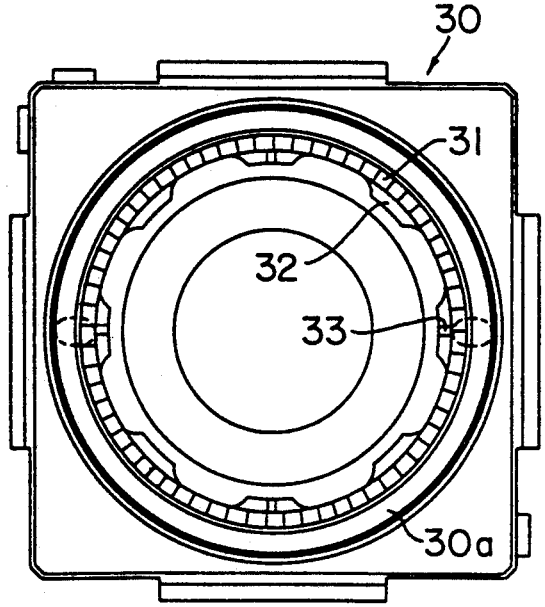
FIG. 4 is an end elevation of the attachment.

Reference is directed to both FIGS. 1 and 4 for a study of how the attachment 30 is locked to the ram 11 and to the hollow shaft 14. FIG. 4 shows the attachment 30 as seen from its rear end 30a which is held against the front end 11a of the ram 11. It will be noted that the attachment 30 has a third set of Curvic coupling teeth 31 formed on the rear end 30a of the attachment 30. This third set of Curvic coupling teeth 31 are arranged annularly with an inside diameter greater than the outside diameter of the second set of Curvic coupling teeth 16 on the hollow shaft 14. Therefore, both second 16 and third 31 sets of Curvic coupling teeth are capable of positive engagement with the first set of Curvic coupling teeth 12 on the ram 11.

Both FIGS. 1 and 4 also indicate a set of locking teeth 32 formed on the inside surface of the attachment 30 at constant angular spacings. These internal locking teeth 32 are intended to coact with the external locking teeth 15 on the hollow shaft 14 for locking the attachment 30 to the hollow shaft.

A comparison of FIGS. 2 and 4 will reveal that the external locking teeth 15 on the hollow shaft 14 can be moved into and out of phase with the internal locking teeth 32 on the attachment 30 with the rotation of the hollow shaft relative to the attachment. Further, the circumferential dimensions of these locking teeth 15 and 32 are greater than their angular spacings. Still further, the outside diameter of the hollow shaft 14 at its external locking teeth 15 is less than the root diameter of the attachment 30 at its internal locking teeth 32, and the root diameter of the hollow shaft 14 at the locking teeth 15 is less than the inside diameter of the attachment 30 at the locking teeth 32.

Accordingly, when positioned out of phase with each other, the two sets of locking teeth 15 and 32 can traverse each other, permitting the attachment 30 to move axially into and out of end to end abutment against the ram 11. After having been positioned in end to end abutment against the ram 11 as shown in FIG. 1, the attachment 30 can be locked to the hollow shaft 14 as the external locking teeth 15 on the hollow shaft are turned into phase with the internal locking teeth 32 on the attachment. The front faces 32a of the locking teeth 32 are held against the rear faces 15a of the locking teeth 15 when the attachment 30 is locked to the hollow shaft 14.

At 29 in FIGS. 1 and 2 is shown a key formed on the hollow shaft 14 for sliding engagement in a keyway 33 formed in the attachment 30. The hollow shaft 14 and the attachment 30 are locked against rotation one with respect to the other upon engagement of the key 29 in the keyway 33.

Operation

Let us assume that the attachment 30 has been mounted to the ram 11 as shown in FIG. 1. The operation of the illustrated mounting mechanism will be explained in terms of how the attachment 30 is dismounted from the ram 11 and how another attachment, not shown, is mounted instead.

The ram 11 may be first thrust forwardly for placing the attachment 30 on a rest, not shown, which is usually incorporated with the machine tool of the type under condition. Then a hydraulic fluid under pressure may be introduced into the rear fluid chamber 17b via the port 19b thereby causing the piston 18 to travel forwardly of the ram 11 together with the hollow shaft 14 and the attachment 30. The second set of Curvic coupling teeth 16 on the hollow shaft 14 and the third set of Curvic coupling teeth 31 on the attachment 30 will both be disengaged from the first set of Curvic coupling teeth 12 on the ram 11 upon forward travel of the hollow shaft 14, spindle 21 and attachment 30 relative to the ram.

Possibly, the attachment 30 on the unshown rest may be thereby prevented from axial displacement with the hollow shaft 14. In that case, the required forward travel of the hollow shaft 14 and the attachment 30 relative to the ram 11 may be accomplished by retracting the ram relative to the hollow shaft and the attachment.

It is understood that the unshown tapered shank which has been engaged in the tapered hole 21a in the spindle 21 is conventionally sprung in the axial direction with respect to the attachment 30. Therefore, as the tapered shank is pushed into the attachment with the forward travel of the spindle 21, a relative axial displacement will take place between hollow shaft 14 and attachment 30, with the consequent disengagement of the key 29 on the hollow shaft from the keyway 33 in the attachment. The hollow shaft 14 will then become free to rotate relative to the attachment 30.

The noted forward travel of the hollow shaft 14 and spindle 21 relative to the ram 11 will result also in the engagement of the detents 25 on the carrier bars 24 in the notches 28a in the spindle flanges 28. This is because the detents 25 remain stationary with respect to the ram 11 as the compression springs 27 hold the carrier bars 24 against the abutment 26 in the face of the forward displacement of the hollow shaft 14 and spindle 21. The hollow shaft 14 is now ready to rotate with the spindle 21.

Then the spindle 21 may be rotated with the hollow shaft 14 through an angle determined by the pitch of the locking teeth 15 and 32, with the attachment 30 held out of rotation by the rest on which it has been positioned. Now the external locking teeth 15 on the hollow shaft 14 have been turned out of phase with the internal locking teeth 32 on the attachment 30.

Then the ram 11 together with the hollow shaft 14 and spindle 21 therein may be retracted away from the attachment 30, with the latter held stationary on the rest. The locking teeth 15 and 32 will then travel past each other, unlocking the attachment 30 from the hollow shaft 14.

Then a desired different attachment, not shown, may be brought to a position opposite the ram 11, as by revolving the attachment rest. It is understood that this new attachment also has a third set of Curvic coupling teeth and a set of internal locking teeth which are both identical with their counterparts designated 31 and 32, respectively, of the attachment 30 that has been just dismounted from the ram 11. These parts of the new attachment will therefore be identified by the same reference numerals as those used to designate the corresponding parts of the old attachment 30 in the following description of how the new attachment is mounted to the ram 11.

The ram 11 may be thrust forwardly to insert the front end portion 14a of the hollow shaft 14 in the new attachment being held in position by the rest. The angular position of the hollow shaft 14 with respect to the ram 11 is now understood to be such that the external locking teeth 15 thereon will travel past the internal locking teeth 32 on the new attachment as the hollow shaft is inserted as above in the new attachment.

It is also understood that both hollow shaft 14 and spindle 21 have been displaced forwardly of the ram 11 by the introduction of the pressurized fluid into the rear fluid chamber 17b, with the consequent engagement of the detents 25 in the notches 28a in the spindle flange 28. Accordingly, with the subsequent rotation of the spindle 21, the hollow shaft 14 will rotate therewith until the external locking teeth 15 thereon come into register with the internal locking teeth 32 on the new attachment.

Then the pressurized fluid may be directed into the front fluid chamber 17a via the port 19a thereby retracting the piston 18 with the hollow shaft 14 relative to the ram 11. The external locking teeth 15 on the hollow shaft 14 will then come into face to face contact with the internal locking teeth 32 on the attachment. Further, with the continued retraction of the hollow shaft 14, the attachment will be thereby pulled toward the ram 11 until both the second set of Curvic coupling teeth 16 on the hollow shaft and the third set of Curvic coupling teeth 31 on the attachment come into positive engagement with the first set of Curvic coupling teeth 12 on the ram 11. The tapered shank of the attachment will be fully engaged in the tapered hole 21a in the spindle 21.

Also, as the hollow shaft 14 retracts with the spindle 21 into the ram 11, the detents 25 will be disengaged from the notches 28a in the spindle flange 28. So unlocked from the hollow shaft 14, the spindle 21 will become free to rotate relative to the hollow shaft for driving the attachment.

For indexing the attachment 30 the piston 18 may be fluid actuated forwardly relative to the ram 11. The forward travel of the piston 18 will result as aforesaid in the disengagement of the second 16 and third 31 sets of Curvic coupling teeth from the first set of Curvic coupling teeth 12 and in the engagement of the detents 25 in the notches 28a. If the machine tool is of the vertical type, the locking teeth 15 and 32 will establish face to face contact with each other, and the key 29 will become engaged in the keyway 33, under the weight of the attachment 30. If the machine tool is of the horizontal type, on the other hand, then the ram 11 may be retracted while the attachment 30 is held on the unshown rest, thereby causing engagement of the key 29 in the keyway 33.

Then the spindle 21 may be rotated through any desired angle. The attachment 30 will then rotate with the hollow shaft 14 and so will be indexed to a desired angular position. Then the piston 18 may be fluid actuated rearwardly.

We claim:

1. An attachment mounting mechanism for a machine tool, comprising:
   (a) a hollow ram having a front end;
   (b) a first set of Curvic coupling teeth formed on the front end of the hollow ram;
   (c) a hollow shaft slidably mounted in the hollow ram for both rotary and axial displacement relative to the same, the hollow shaft having a front end projecting forwardly out of the front end of the hollow ram;
   (d) a series of external locking teeth formed on the front end of the hollow shaft at constant circumferential spacings;
   (e) a second set of Curvic coupling teeth formed on the hollow shaft in a position spaced toward the hollow ram from the front end of the hollow shaft, the second set of Curvic coupling teeth being movable into and out of positive engagement with the first set of Curvic coupling teeth on the hollow ram with the axial movement of the hollow shaft relative to the hollow ram;
   (f) a spindle rotatably mounted in the hollow shaft and constrained to joint axial displacement therewith relative to the hollow ram;
   (g) a plurality of attachments to be interchangeably mounted to the front end of the ram, each attachment having a third set of Curvic coupling teeth capable of positive engagement with the first set of Curvic coupling teeth on the ram, and a series of internal locking teeth to be engaged by the external locking teeth on the hollow shaft for holding the third set of Curvic coupling teeth in positive engagement with the first set of Curvic coupling teeth;
   (h) angular indexing means for positioning the external and the internal locking teeth in or out of phase with each other by rotating the hollow shaft relative to the hollow ram; and
   (i) clamping means for causing the external and the internal locking teeth to contact face to face with each other by axially moving the hollow shaft relative to the hollow ram.

2. The attachment mounting mechanism of claim 1 wherein the angular indexing means includes detent means for interengaging the hollow shaft and the spindle for joint rotation relative to the hollow ram upon axial displacement of the hollow shaft and the spindle toward the front end of the hollow ram, and for disengaging the hollow shaft and the spindle from each other upon axial displacement thereof in a direction away from the front end of the hollow ram.

3. The attachment mounting mechanism of claim 1 wherein the clamping means comprises:
   (a) a piston formed concentrically on the hollow shaft for joint movement therewith relative to the hollow ram; and
   (b) means defining a pair of hydraulic fluid chambers on the opposite sides of the piston.

* * * * *

UNITED STATES PATENT AND TRADEMARK OFFICE
CERTIFICATE OF CORRECTION

PATENT NO. : 5,027,682
DATED : July 2, 1991
INVENTOR(S) : Katsuyoshi Aiso, et. al.

It is certified that error appears in the above-indentified patent and that said Letters Patent is hereby corrected as shown below:

Title page,

At each occurrence of "Curvic" read --"CURVIC"--, that is, at the following occurrences:

On the first page (title page), in the [57] ABSTRACT, at lines 7 and 9.

Column 1, lines 45, 47, 49, 51, 64, 65 and 68.
Column 2, lines 2, 12, 14, 16, 23 and 60.
Column 3, lines 15, 17 and 18.
Column 4, lines 28, 30, 32, 34 and 35.
Column 5, lines 22, 23 and 25.
Column 6, lines 4, 40, 41, 43 and 56 (twice).
Column 7, lines 8, 18, 21, 23 and 31.
Column 8, lines 1, 4 and 5.

Column 1, line 45, read "(tradename)" as
--(Registered Trademark)--.

Signed and Sealed this

Nineteenth Day of October, 1993

Attest:

BRUCE LEHMAN

*Attesting Officer*         *Commissioner of Patents and Trademarks*